March 24, 1942. J. J. O'CONNELL 2,277,140
DOOR HOLDER
Filed Dec. 27, 1939

INVENTOR
John J. O'Connell
BY
ATTORNEY

Patented Mar. 24, 1942

2,277,140

UNITED STATES PATENT OFFICE 2,277,140

DOOR HOLDER

John J. O'Connell, Brooklyn, N. Y.

Application December 27, 1939, Serial No. 311,205

2 Claims. (Cl. 292—338)

The present invention pertains to door stops of the type having a pivoted arm embodying a head swingably sustained between a pair of bearings projecting from a bracket appropriately fastened to the bottom part of a swingable door. The object of the invention, among others, is to provide a door stop of the type alluded to wherein the swingable stop may be held in a retained but in an inoperative relation by locking means independent of either of the projecting bearings of the bracket and particularly by a locking washer retained and held in a predetermined non-rotatable position within a suitable chamber of the head of the swingable arm for advantageously and conveniently cooperating with spring controlled spheroidal means bodily rotatable with the arm. Other aspects, and functional and structural features and important advantages of the invention will be realized from the following detailed description considered in connection with the accompanying drawing in which:

Figure 1:
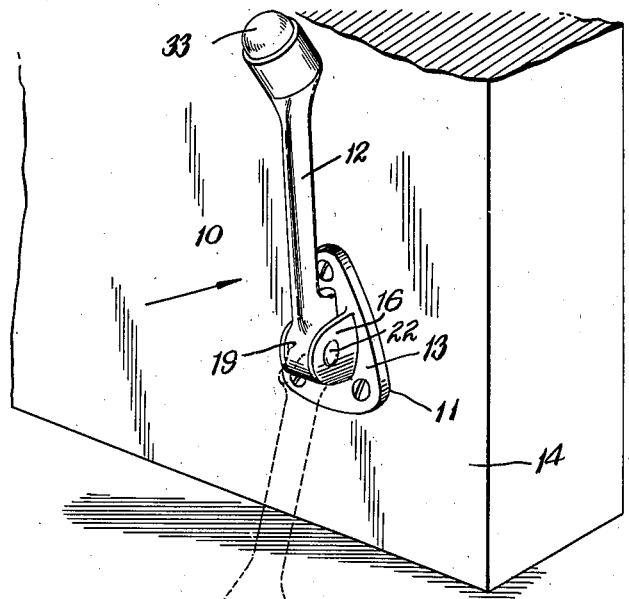
Fig. 1 is a perspective view of the door stop, showing the latter in full lines in its raised and locked position, and in dash lines in its retaining position against the flooring.
Figures 2, 3, 4, 5:
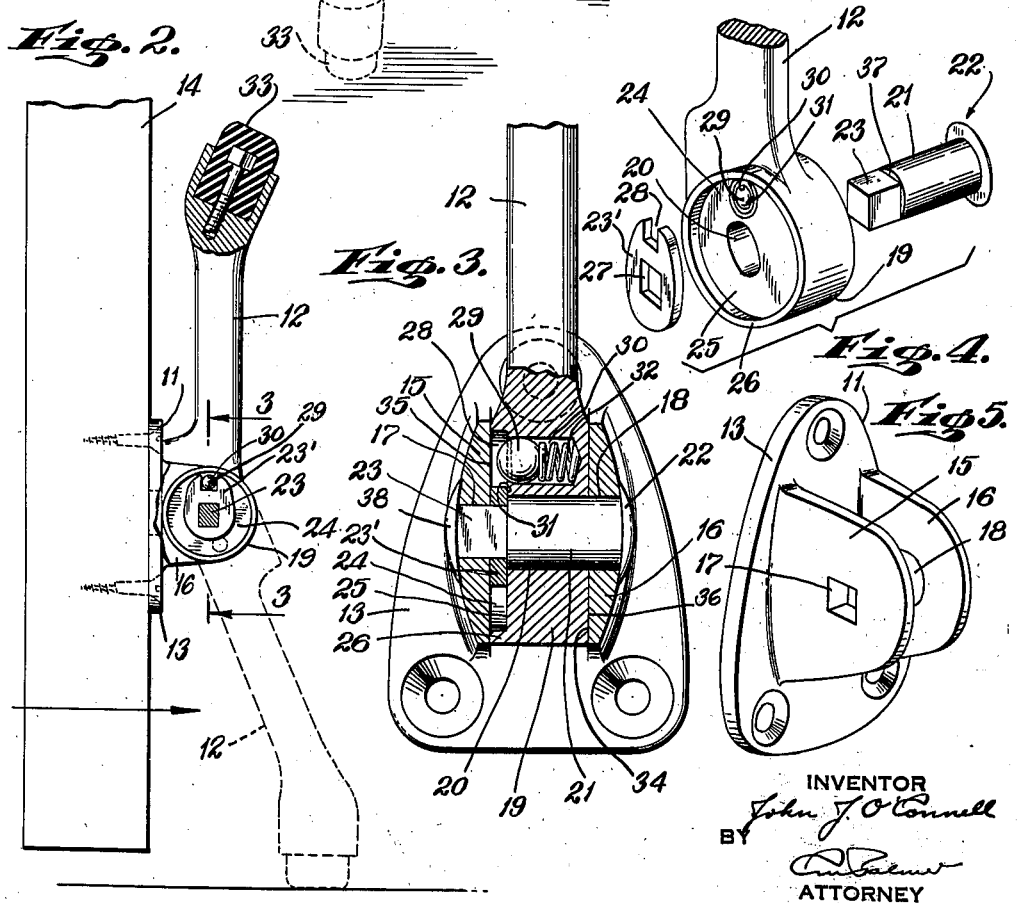
Fig. 2 is a side view of Fig. 1 shown partly in section and partly broken away.
Fig. 3 is an enlarged sectional view on the line 3—3 of Fig. 2.
Fig. 4 is a fragmentary exploded view of the door stop, and particularly illustrating the locking means thereof.
Fig. 5 is a perspective view of the bracket.

According to the invention the door stop generally denoted 10 comprises a bracket or supporting mount 11 and a swingable locking arm 12. The bracket includes a rear wall 13 appropriately fastened to the lower part of a swingable door 14. Integral with wall 13 and projecting forwardly thereof is a pair of flanges or bearings 15 and 16 and these respectively embody openings 17 and 18, the opening 17 being substantially square shaped and in axial alinement with the circular opening 18.

Swingably interposed between the spaced bearings 15 and 16 is the substantially annular head 19 of the rotatable arm 12. This head is provided with the axial bore 20 adapted to receive the cylindrical shank 21 of the fulcrum bolt 22 threaded into opening 18 of bearing 16 to extend concentrically into bore 20.

Although the swingable arm 12 may be rotated relative to shank 21, the latter is prevented from rotation by reason of its square terminal or end 23 thereof fitting closely in the corresponding square shaped opening 17 in bearing 15.

However it should be noted that in the matter of assembly, the locking metal washer 23' is first placed within the chamber or recess 24 defined by the flat face or surface 25 and the annular flange or rim 26. This washer has a square shaped opening 27 fitting closely over terminal 23 and is therefore held in one position against rotation within recess 24. The washer 23' also includes the notch or recess 28 adapted to interlock with the spring controlled spheroidal member 29 retained in socket 30 in the head 19 of the swingable arm by the annular retaining flange 31 against which spheroidal member or ball 29 is urged by spring 32.

In the fully raised position of the arm 12, ball 29 is partly within notch 28 and consequently the arm 12 is locked and is held in the non-braking position illustrated in full lines in Fig. 1.

The arm 12 however may be readily unlocked manually or by foot pressure in the matter of applying a force thereon sufficient for the ball 30 to be yieldingly moved out of notch 28 whereby the ball is ultimately out of the locking washer and hence the arm swings downwardly until the fixed rubber foot 33 strikes to engage the floor for braking the door as is well understood.

Where the ball is out of the locking washer, rim 26 and face 34 rotate relative to the rectilinear guide faces 35 and 36 of the bearings 15 and 16 and it should be observed that the locking washer is closely confined against shoulder 37 within recess 24 between walls 25 and 35 and hence the washer is prevented from being displaced longitudinally of the shank 21 and of course during rotation of the head of arm 12, ball 29 not only compresses spring 32 but idly and yieldingly contacts the adjacent vertical surface of the locking washer which in this instance acts as a bearing.

If the arm is revolved to its fully raised position, the ball automatically enters notch 28 in the washer by reason of the outward thrust applied to the ball on the part of the normally expanded helicoidal spring 32 and if desired the squared end 23 may be upset to provide head 38 to preclude longitudinal displacement of the bolt relative to the spaced bearings 15 and 16.

While the invention has been described in detail and reference has been made to specific applications thereof, it is to be understood that the invention herein disclosed is not limited to such specific applications and it is intended that all matter contained in the above description or shown in the accompanying drawing shall be interpreted as illustrative and not in a limiting sense.

I claim:

1. In a door stop, a mount having spaced bearings, a bolt fixedly sustained by said bearings and including a non-circular end, a swingable retaining arm having a head rotatably mounted on said bolt and including a recess, a washer disposed within said recess adjacent one of said bearings and independent of said mount and non-rotatably supported on said end and provided with a notch, and spring controlled means carried by said head for disconnectably interlocking with the walls of said notch in a raised position of said arm.

2. In a door stop, a mount having spaced bearings, a bolt fixedly sustained by said bearings and including a non-circular end, a swingable retaining arm having a head rotatably mounted on said bolt and including a recess, a washer disposed within said recess adjacent one of said bearings and independent of said mount and non-rotatably supported on said end and provided with a substantially rectangularly shaped notch, and spring controlled spheroid means carried by said head for disconnectably interlocking with the walls of said notch in a raised position of said arm.

JOHN J. O'CONNELL.